Feb. 23, 1965  B. F. FROEHLICH  3,170,340
ROTARY TABLE WITH DIVIDING ATTACHMENT
Filed Jan. 29, 1963
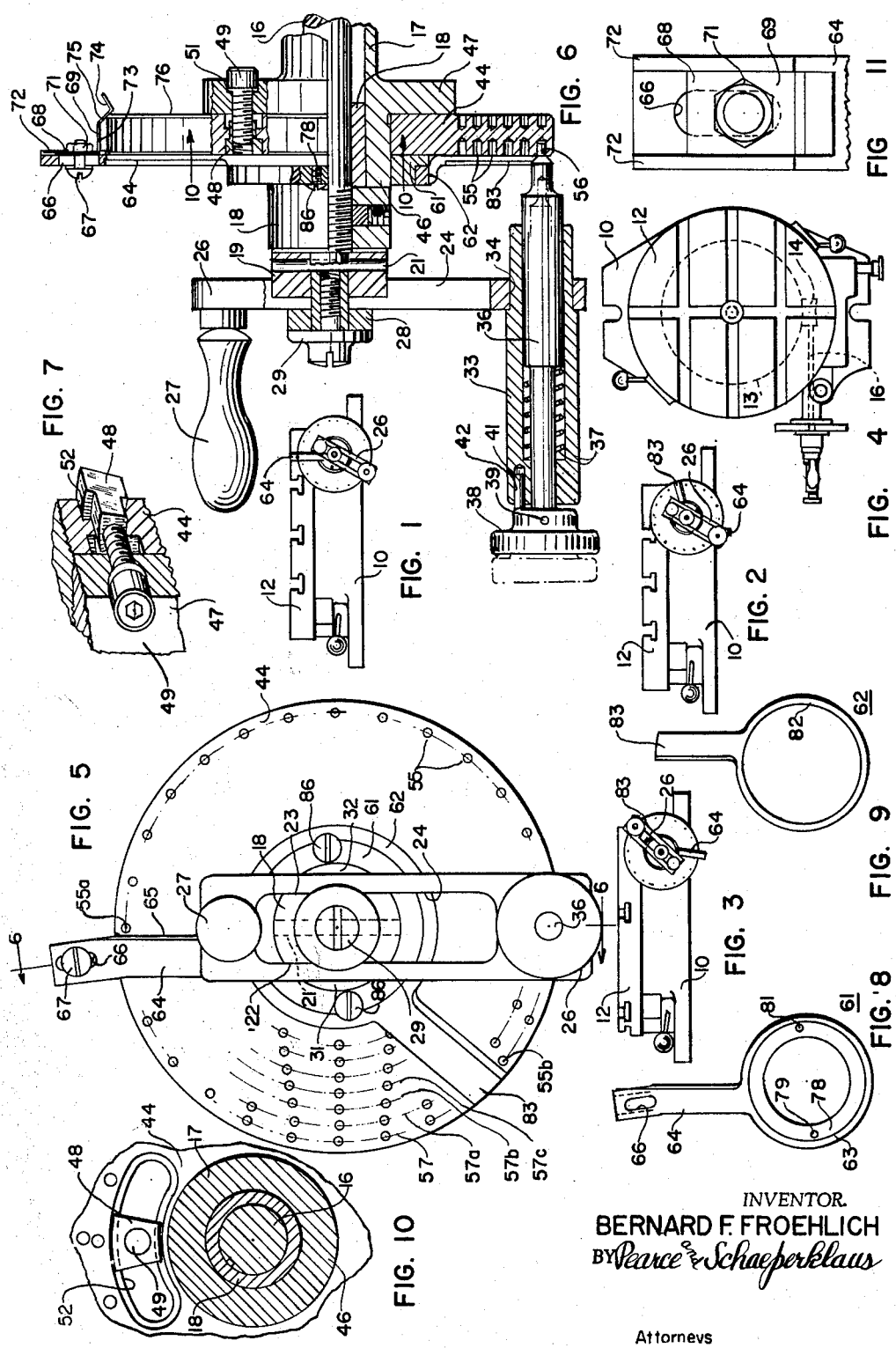
INVENTOR.
BERNARD F. FROEHLICH
BY Pearce & Schaeperklaus
Attorneys

United States Patent Office 3,170,340
Patented Feb. 23, 1965

3,170,340
ROTARY TABLE WITH DIVIDING ATTACHMENT
Bernard F. Froehlich, Colerain Township, Hamilton County, Ohio (% Troyke Mfg. Co., 11294 Orchard St., Sharonville, Cincinnati, Ohio)
Filed Jan. 29, 1963, Ser. No. 254,634
5 Claims. (Cl. 74—813)

This invention relates to rotary work tables. More particularly this invention relates to a dividing attachment for a rotary table.

An object of this invention is to provide an attachment for a rotary table by means of which it is possible to index the table a predetermined angular distance automatically and without need for use of scales, gauges or the like.

A further object of this invention is to provide such an attachment with which it is possible to index the table repeatedly for the predetermined angular distance.

For this purpose a perforated index plate is mounted on the table surrounding a main or worm shaft thereof, and a plunger is mounted on the shaft in position for engagement with selected perforations of the index plate.

A further object of this invention is to provide a mounting for such an index plate which permits adjustment of the index plate circumferentially of the shaft to permit alignment of the plunger with a selected perforation when the table is in a selected or predetermined position.

Such an index plate can have a large number of holes or perforations therein, and a further object of this invention is to provide a device for automatically locating a selected perforation when the table is indexed a predetermined angular distance.

A further object of this invention is to provide such a perforation locating device which includes a pair of members rotatably mounted on the main shaft, each of said members having an outwardly directed arm engageable by the plunger, means for locking the members with the arms spaced a predetermined angular distance, and a spring means mounted on one of the arms for holding the members in a selected position while permitting turning thereof around the shaft to another selected position.

The above and other objects and features of the invention will be apparent to those skilled in the art to which this invention pertains from the following detailed description, and the drawing, in which:

FIG. 1 is a view in side elevation of a rotary work table embodying a dividing attachment constructed in accordance with an embodiment of this invention, the dividing attachment being shown in a first predetermined position;

FIG. 2 is a view in side elevation of the rotary table illustrated in FIG. 1 showing the dividing attachment in a second position;

FIG. 3 is a view in side elevation of the rotary table showing the dividing attachment in a third position;

FIG. 4 is a plan view of the rotary table;

FIG. 5 is an enlarged view in side elevation of the dividing attachment, some perforations being omitted for clarity;

FIG. 6 is a view in section taken generally on the line 6—6 in FIG. 5;

FIG. 7 is a fragmentary sectional perspective view showing details of construction of a brake mechanism forming a part of the device;

FIG. 8 is a view in side elevation of a first perforation locating member forming a part of the dividing attachment;

FIG. 9 is a view in side elevation of a second perforation locating member of the dividing attachment;

FIG. 10 is an enlarged view in section taken on the line 10—10 in FIG. 6; and

FIG. 11 is an enlarged fragmentary view in side elevation showing a portion of an arm of the first perforation locating member and a spring mounted thereon.

In the following detailed description, and the drawing, like reference characters indicate like parts.

In FIGS. 1-4 inclusive is illustrated a rotary table which includes a body or housing 10 and a table 12. A worm wheel 13 (FIG. 4), mounted on the underside of the table 12, is turned by a worm 14 in the usual manner. The worm 14 is mounted on a main or worm shaft 16 which, in turn, is rotatably mounted inside a housing 17 in bearings 18 (FIG. 6, only one of which is shown). A nut 18 is threaded to the worm shaft to hold the worm shaft in position in the housing 17. A hub member 19 is mounted on and attached to the shaft 16 by means of a pin 21. The hub member 19 includes flat faces 22 and 23 (FIG. 5) which are received inside an opening 24 in a crossbar or crank 26. At one end of the crank 26 is mounted a handle 27 by means of which the crank 26 and the shaft 16 can be turned for turning the worm to index or turn the table 12. A collar 28 and a screw 29 mounted on the shaft 16 hold the crank 26 in engagement with shoulders 31 and 32 (FIG. 5) of the hub member 19. The screw 29 can be loosened to permit adjustment of the crank transversely of the shaft 16 (up and down as shown in FIGS. 5 and 6).

A plunger housing 33 (FIG. 6) is mounted in an opening 34 in an end portion of the crank 26. The plunger housing 33 carries a plunger 36 which is urged to the right as shown in FIG. 6 by a compression spring 37. A cap 38 mounted on and attached to the plunger 36 by means of a pin 39 can be used for pulling the plunger to the left as shown in FIG. 6. A pin 41 mounted in the cap 38 is received in one of a pair of bores 42 in the plunger housing 33 when the plunger 36 is in the full line position of FIG. 6 and can engage the housing to hold the plunger in the dot-dash line position of FIG. 6.

An index plate 44 is rotatably mounted on a boss 46 forming a part of the housing 17. The index plate 44 backs up against an annular flange 47 on the housing 17. The index plate 44 is held against the flange 47 by means of a brake shoe 48 and a screw 49 threaded into the brake shoe 48. The screw 49 is mounted in a socket 51 in the flange 47. The shoe 48, as shown in FIGS. 6 and 7, is of generally T-shape and is received in an arcuate slot 52 (FIG. 10) in the index plate 44 so that, when the screw 49 is loosened, the index plate 44 can be turned around the boss 46 through a predetermined arc and can be held in place by the brake shoe 48 at any position along this predetermined arc.

The index plate 44 (FIG. 5) is provided with a plurality of perforations 55, each of which can receive a tip 56 of the plunger 36. The perforations are arranged in a plurality of concentric circular rows 57, 57a, 57b, 57c, etc., as shown in FIG. 5. Each row can have a full circle of equally spaced perforations, with the number of perforations varying between rows so that a large variety of angular spacings between perforations is provided. Only a selected portion of the perforations is shown in detail in the drawing for simplicity. The table can be indexed by means of the crank 26 until the table is in a selected initial position. Then, the screw 49 (FIG. 7) can be loosened to release the brake shoe 48 from the index plate, and the index plate can be turned to bring one of the perforations 55 of a selected row into alignment with the tip 56 of the plunger 36 to mark an initial or starting position, whereupon the screw 49 (FIG. 7) can be tightened to cause the shoe 48 to engage the index plate 44 and lock the index plate in position. The crank 26 is shown in position for engagement of the plunger tip with the perforations in the outer row 57 of perforations, but it will be understood that the crank can be adjusted transversely of the worm shaft 16 when the screw 29 (FIG. 6) is loosened to bring the plunger tip 56 into alignment with any selected row of perforations.

When the operation at the first position has been completed, the table is turned or indexed a predetermined distance by turning the crank through a selected angle, which can consist of a part of a turn or one or more turns plus a part of a turn, the part of a turn ending with the tip 56 of the plunger 36 opposite a selected perforation. The perforation to which the table is to be turned can be located by means of a perforation locating assembly which includes members 61 and 62. As shown in FIG. 8, the member 61 includes a central body 63 and an outwardly extending arm 64.

As shown in FIG. 6, the member 61 is rotatably mounted on the boss 46 adjacent the index plate 44. As shown in FIG. 5, one face 65 of the arm 64 is parallel to and spaced from a radius approximately one-half the diameter of one of the perforations 55. A radially extending slot 66 is provided in an outer portion of the arm 64 which extends outwardly of the index plate. The slot 66 receives a bolt 67. As shown in FIGS. 6 and 11, a flange 68 of a flat spring 69 is mounted on the bolt 67 and held against the arm 64 by a nut 71 mounted on the bolt 67. Tracks 72 (FIG. 11) on the arm 64 guide the spring 69 for sliding along the arm. The spring includes a second flange 73 (FIG. 6) which extends transversely of the arm 64 and terminates in a V-shaped portion 74 having an inclined section 75 engageable with a bevelled edge 76 of the index plate 44. The spring 69 is adjustable along the arm 64 until the inclined section 75 of the V-shaped portion 74 firmly engages the bevelled edge 76 of the index plate 44 to resist turning of the member 61 about the axis thereof and to hold the member 61 substantially in flush face-to-face relation with the index plate 44. The spring is set so that application of a predetermined force turns the members, but the spring prevents turning unless the predetermined force is applied.

The member 61 (FIG. 8) includes an annular shoulder 78 in which threaded sockets 79 and 81 are provided. The member 62 (FIG. 9) includes a circular body 82 which, as shown in FIG. 6, is rotatably mounted on the member 61 exteriorly of the annular shoulder 78. An arm 83 (FIG. 9) extends outwardly from the body 82. The arm 83 is in substantially flush face-to-face relationship with the index plate 44 when the member 62 is mounted on the member 61. Screws 86 (FIG. 5) received in the sockets 79 and 81 (FIG. 8) can lock the members 61 and 62 in selected positions of angular relationship.

When the attachment is in use and, after each operation, the table is to be indexed or turned an angular distance such that the crank 26 must be turned a selected number of full turns plus the angular distance between two selected perforations such as the perforations 55a and 55b of FIG. 5, the arms 64 and 83 are set in the position shown in FIG. 5 and locked in that position by means of the screws 86. The index plate 44 is adjusted so that an initial position is located when the tip 56 of the plunger 36 is received in the perforation 55b and the crank 26 is swung to this position, as shown in FIG. 1. Then the operation at the initial position can be performed. Next the assembly of the members 61 and 62 is swung until the arm 64 is brought into substantial engagement with the tip 56 of the plunger 36 as shown in FIG. 2. Then the crank 26 is turned to the selected number of turns and is further turned until the tip 56 of the plunger 36 is opposite the perforation adjacent the arm 83, as shown in FIG. 3, whereupon the tip 56 is advanced into that perforation and the machine is set up for the second operation. This series of steps is then repeated when the second operation has been completed, and, by means of this attachment, the position of the perforation into which the tip is to be placed for each succeeding operation is automatically located.

The machine illustrated in the drawing and described above is subject to structural modification without departing from the spirit and scope of the appended claims.

Having described my invention, what I claim as new and desire to secure by Letters Patent is:

1. In combination with a rotary work table which comprises a base, a table member rotatably mounted on the base, a worm wheel mounted on the table member, a worm gear meshing with the worm wheel, a shaft for turning the worm gear, a housing mounted on the base and surrounding the shaft, an indexing device comprising an index plate pivotally mounted on the housing surrounding the shaft, means for locking the index plate in a selected angular position, said index plate having a plurality of circumferentially spaced perforations, a crank mounted on the shaft, a plunger mounted on the crank and releasably engageable with the perforations to hold the crank and shaft in selected positions, and a perforation locating assembly mounted on the housing adjacent the index plate, the perforation locating assembly comprising a pair of members rotatably mounted on the housing surrounding the shaft, each of said members having an outwardly projecting index arm, means for locking the members with the index arms at a selected angular spacing, one of the arms extending outboard of the index plate, and a resilient member mounted on the outboard portion and engageable with the index plate to resist turning of the members around the shaft, the members being turnable upon application of a predetermined force.

2. In combination with a rotary work table having a shaft for turning a table member thereof, an index plate pivotally mounted on the shaft, means for locking the index plate in a selected angular position, said index plate having a plurality of circumferentially spaced perforations, a crank mounted on the shaft, a plunger mounted on the crank and releasably engageable with the perforations to hold the crank and shaft in selected positions, and a perforation locating assembly rotatably mounted on the shaft adjacent the index plate, the perforation locating assembly comprising a pair of members, each of said members having an outwardly projecting index arm, means for locking the members with the index arms at a selected angular spacing, one of the arms extending outboard of the index plate, and a resilient member mounted on the outboard portion and engageable with the index plate to resist turning of the members around the shaft, the members being turnable upon application of a predetermined force.

3. In combination with a rotary work table having a shaft for turning a table member thereof, an index plate pivotally mounted on the shaft, means for locking the index plate in a selected angular position, said index plate having a plurality of circumferentially spaced perforations in a face thereof, a crank mounted on the shaft, a plunger mounted on the crank and releasably engageable with the perforations to hold the crank and shaft in selected positions, and a perforation locating assembly rotatably mounted on the shaft adjacent the index plate, the perforation locating assembly comprising a pair of members, each of said members having an outwardly projecting index arm, means for locking the members with the index arms at a selected angular spacing, one of the arms extending outboard of the index plate, and a resilient member mounted on the outboard portion, said resilient member having an inclined portion engageable with the index plate at an edge thereof spaced from the perforated face to resist turning of the members around the shaft and to hold the members with the index arms adjacent the index plate, the members being turnable upon application of a predetermined force.

4. In combination with a rotary work table which comprises a base, a table member rotatably mounted on the base, a worm wheel mounted on the table member, a worm gear meshing with the worm wheel, a shaft for turning the worm gear, a housing mounted on the base and surrounding the shaft, an indexing device comprising an index plate mounted on the housing surrounding the shaft, said index plate having a plurality of circumferentially spaced perforations, a crank mounted on the shaft, a plunger mounted on the crank and releasably engageable with the perforations to hold the crank and shaft in selected positions, and a perforation locating assembly mounted on the housing adjacent the index plate, the perforation locating assembly comprising a pair of members rotatably mounted on the housing surrounding the shaft, each of said members having an outwardly projecting index arm, means for locking the members with the index arms at a selected angular spacing, one of the arms extending outboard of the index plate, and a resilient member mounted on the outboard portion and engageable with the index plate to resist turning of the members around the shaft, the members being turnable upon application of a predetermined force.

5. In combination with a rotary work table which comprises a base, a table member rotatably mounted on the base, a worm wheel mounted on the table member, a worm gear meshing with the worm wheel, a shaft for turning the worm gear, a housing mounted on the base and surrounding the shaft, an indexing device comprising an index plate pivotally mounted on the housing surrounding the shaft, there being a circumferentially extending slot in the index plate, a shoe member received in said slot, a bolt mounted in the housing and received in the shoe for releasably holding the shoe in engagement with the index plate to lock the index plate in a selected angular position, said index plate having a plurality of circumferentially spaced perforations, a crank mounted on the shaft, a plunger mounted on the crank and releasably engageable with the perforations to hold the crank and shaft in selected positions, and a perforation locating assembly mounted on the housing adjacent the index plate, the perforation locating assembly comprising a pair of members rotatably mounted on the housing surrounding the shaft, each of said members having an outwardly projecting index arm, means for locking the members with the index arms at a selected angular spacing, one of the arms extending outboard of the index plate, and a resilient member mounted on the outboard portion and engageable with the index plate to resist turning of the members around the shaft, the members being turnable upon application of a predetermined force.

References Cited by the Examiner
UNITED STATES PATENTS 2,357,329  9/44  Hansen _____ 74—815
2,567,936  9/51  Hansen _____ 90—57

BROUGHTON G. DURHAM, *Primary Examiner*.